United States Patent

[11] 3,568,096

[72] Inventors Ronald W. Kordos
North Andover, Mass.;
Thomas A. McCurdy, Columbus, Ohio
[21] Appl. No. 848,951
[22] Filed Aug. 11, 1969
[45] Patented Mar. 2, 1971
[73] Assignee Bell Telephone Laboratories, Incorporated
Murray Hill, Berkeley Heights, N.J.

[54] APPARATUS FOR AUTOMATICALLY SWITCHING HIGH FREQUENCY SIGNALS
14 Claims, 15 Drawing Figs.

[52] U.S. Cl. .......... 333/7, 333/84, 333/32
[51] Int. Cl. .......... H01p 5/12, H01p 3/08, H03h 7/38
[50] Field of Search .......... 333/7, 32, 84; 317/112, 113, 115, 120; 335/4, 5

[56] References Cited
UNITED STATES PATENTS

| | | | |
|---|---|---|---|
| 3,087,125 | 4/1963 | Scholefield .......... | 333/5X |
| 3,331,991 | 7/1967 | Carlisle et al. .......... | 333/7X |
| 3,355,684 | 11/1967 | Church et al. .......... | 333/5 |

OTHER REFERENCES
" Characteristics and Applications of Microstrip For Microwave Wiring" Arditi in IRE Transactions On Microwave Theory and Techniques, Volume MTT-3, Number 2, March 1955, TK 7800 123, pages 31 and 38

*Primary Examiner*—Herman K. Saalbach
*Assistant Examiner*—Marvin Nussbaum
*Attorneys*—R. J. Guenther and Edwin B. Cave

ABSTRACT: A device for establishing a high frequency signal conducting path between two groups of transmission lines is disclosed which contains cable switches and a strip line assembly. Both the cable switches and the strip line assembly are joined to each other at one end and at the opposite end one is joined to one transmission line group while the other is joined to the second transmission line group.

PATENTED MAR 2 1971

3,568,096

SHEET 1 OF 5

INVENTORS R. W. KORDOS
T. A. McCURDY

BY [signature]

ATTORNEY

APPARATUS FOR AUTOMATICALLY SWITCHING HIGH FREQUENCY SIGNALS

BACKGROUND OF THE INVENTION

This invention relates to broadband high frequency switching devices and pertains particularly to those which automatically interconnect transmission lines carrying signals in the range of 50 to 100 mHz.

In communication systems designed to carry signals over a number of alternate lines, its is often desirable to selectively interconnected one line to another. Where the signals being carried are broadband, high frequency signals, however, the electrical characteristics of the apparatus interconnecting the lines must be carefully controlled.

Because high frequency signals are so sensitive to change in electrical characteristics, it has been extremely difficult to maintain signal integrity while making interconnections on an automatic basis, i.e., through automatic switching devices. Typically, therefore, high frequency signals are switched by manual patching arrangements. With such arrangements, however, it is necessary to either keep someone at the switching location or to send someone when switching is required. Clearly, this arrangement is neither efficient nor economical.

Broadly, therefore, the object of this invention is to switch broadband high frequency signals between signal carrying lines on an automatic basis.

Heretofore, apparatus for selectively interconnecting signal carrying lines typically contained a conductor path array arranged in a symmetrical ro tree configuration. While suitable for low frequency operation, such conductor path arrays, among other things, attenuate the signals and introduce distortion when conducting broadband, high frequency signals. In short, they are unsuitable for high frequency applications because of their deleterious effect on signal quality.

A specific object of this invention, therefore, is to preserve the quality of broadband, high frequency signals as they are switched from one line to another over a conductor path array.

Still another object of this invention is to subject the signals to the same effective characteristic impedance regardless of which particular conductor path is traversed.

SUMMARY OF THE INVENTION

In accordance with the preferred embodiment of this invention, a group of cable switches cooperate with a conductor path array to interconnect a common transmission line and a transmission line selected from a group of individual transmission lines. More specifically each cable switch is paired with an individual transmission line, the conductor path array is a symmetrical tree and each conductor path includes at least two serially connected segments, shares at least one segment in common with another conductor path and is characterized in that it terminates on a cable switch, acts as a section of transmission line and has the same effective length as ever other conductor path. Consequently, a signal passing between the common transmission line and any individual transmission line travels a path of equal length and encounters the same effective characteristic impedance.

In accordance with one feature of this invention, equal effective conductor path lengths are obtained by connecting the conductor segments into a symmetrical array of conductor paths having a common input for the common transmission line and a separate input for each of the individual transmission lines.

In accordance with another feature of this invention, each conductor path acts as a section of transmission line. Specifically, all of the conductor paths are supported on a circuit board and the circuit board lies between two ground plane conductors. When spaced between the two ground plane conductors, the conductor paths act as the center conductors of a strip transmission line.

In accordance with another feature of this invention, one ground plane conductor is separated from the conductor paths by an airgap while the second is attached directly to the body of the circuit board. In order to located the conductor paths with respect to the ground planes, the second ground plane conductor includes spring loops for positioning the circuit board in a support housing and spring tabs for holding it in place once it has been positioned.

In accordance with another feature of this invention, each cable switch includes a coaxial line segment having a length of at least 0.005 wavelength whereby isolation loss in the switching device is substantially increased.

According to another feature of this invention, each coaxial line segment includes a 0.010-inch diameter copper center conductor, a portion of an outer conductor tube having an inner diameter of 0.200 inch and a sleeve located between the inner and outer conductors and having a relative dielectric constant of 2.3 whereby the characteristic impedance of the coaxial line segment will exceed 120 ohms.

In accordance with another feature of this invention each coaxial line segment includes a connector member having at either end pockets adapted to engage adjacent reed switches whereby the union of the two is facilitated In accordance with another feature of this invention, attenuation of transmitted signals is diminished by plating a gold-silver alloy over the entire conducting surface of each reed switch.

BRIEF DESCRIPTION OF THE DRAWING

The foregoing objects and features of the invention, as well as others not specifically set forth, can best be understood by reference to the following detailed description and drawing in which.

DETAILED DESCRIPTION

Figure 1:
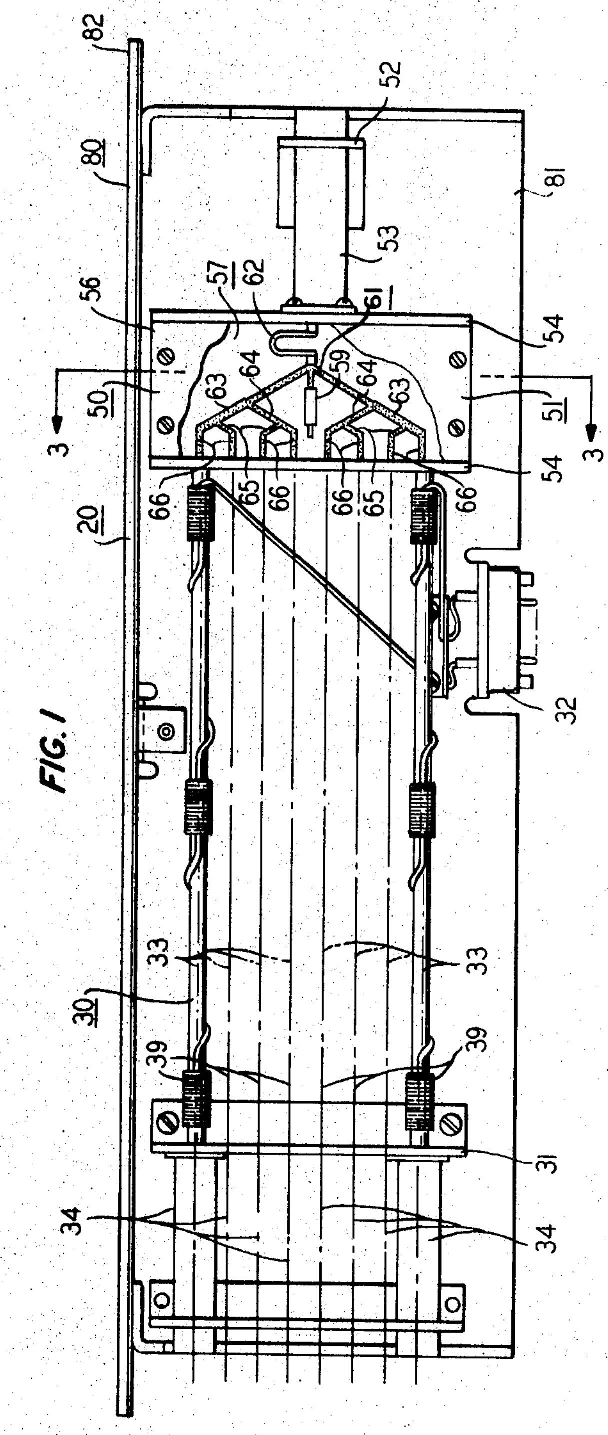
FIG. 1 is a plan view of a switching device constructed in accordance with this invention.
Figure 2:
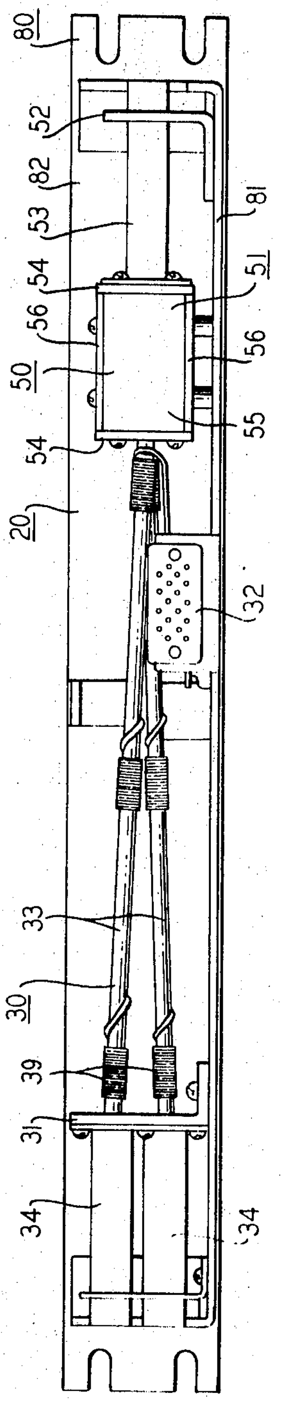
FIG. 2 is an elevation view of the embodiment shown in FIG. 1.

Referring to FIGS. 1 and 2, a broadband high frequency switching device 20 is disclosed which comprises three major components, i.e., a cable switch assembly 30, a conductor path assembly 50 and a frame assembly 80. In operation the switching device 20 automatically switches a high frequency signal through a conductor path interconnecting a common transmission line (not shown) and a transmission line selected from several individual transmission lines (not shown). In the embodiment disclosed, the common transmission line terminates on the conductor path assembly 50, the individual transmission lines terminate on the cable switch assembly 30, and the specific conductor paths over which the signal travels is enabled by cooperative interaction between the two assemblies. More particularly, the conductor path assembly 50 extends a conducting path from the common transmission line toward the individual transmission lines, while the cable switch assembly 30 completes that path to a selected individual transmission line. Finally, the frame 80 supports the cable switch assembly 30 and the conductor path assembly 50 in a conventional manner and facilitates installation of the switching device 20 as a unitary assembly in a working location. The following paragraphs discuss each of the foregoing components in details.

The cable switch assembly 30 as best seen in FIGS. 1 and 2, comprises a bracket 31, a connector terminal 32, a plurality of cable switches 33 and a plurality of jacks 34. The bracket 31 is a conventional supporting member and is made, for example, of aluminum As can be seen in FIG. 2, it is a substantially L-shaped member attached at one end to the frame assembly 80.

The connector terminal 32 acts as the interface between internal control wiring in the switching device 20 and an external control circuit (not shown). It is a standard commercially available unit such as type XAC18 manufactured by the Winchester Connector Company and is mounted on the frame assembly 80 in a standard manner.

Figure 5:
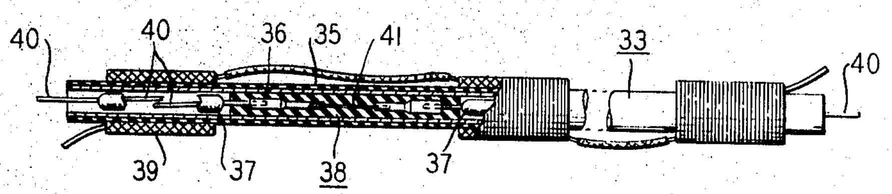
FIG. 5 is an elevation view with portions broken away to show details of a cable switch assembly.
Figure 6:
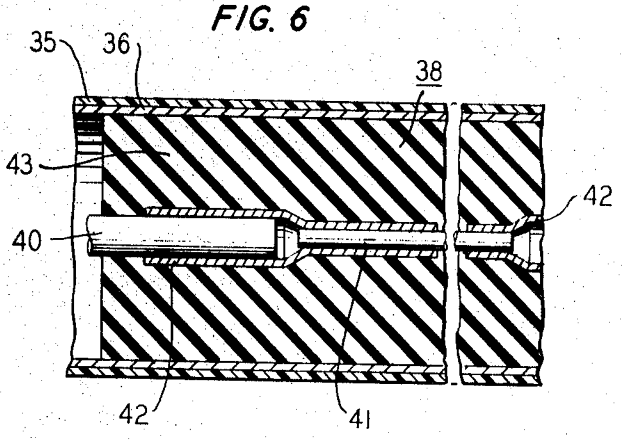
FIG. 6 is an enlarged view of a portion of a cable switch unit shown in FIG. 5 illustrating the details of a coaxial line segment.

The cable switches 33 are the active switching elements in the switching device 20 and as illustrated in FIGS. 1 and 2, are suspended between the conductor path assembly 50 and one side of the bracket 31. As shown in FIGS. 5 and 6, each cable switch 33 is a two-element switch and includes an insulating sleeve 35, a tube 36, reed switches 37, coaxial line segments 38 and coil units 39.

As shown in FIG. 5, the reed switches 37 are equispaced within the tube 36. The coil units 39 are each made up of three coils which are serially connected and each coil is wound in a conventional manner around the tube 36 at the position of a reed switch 37. Finally, the ends of adjacent reed switches 37 are joined in series by coaxial line segments 38.

In the embodiment illustrated, the insulating sleeve 35 is made of a heat-shrinkage electrically insulating material such as Alphlex Fit 221 as manufactured by the Alpha Wire Company while the tube 36 is made of silver-plate copper, has a length of approximately 8 inches, sidewalls about 0.005 inch thick and an inner diameter of 0.200 inch. Each reed switch 37 contains a pair of overlapping encapsulated contacts 40 and is of the 237 type as manufactured by the Western Electric Company. The reed switches 37 are conventional except that the contacts 40 are plated with a gold-silver alloy over the entire signal conducting surface. It has been found that plating in this manner reduces insertion loss in the cable switch by a substantial amount for signal frequencies in the range of 50 to 100

Each coaxial line segment 38 has a length in excess of 0.005λ at signal frequencies in the range of 50 to 100 mHz. It is known that the ratio of isolation loss of a two-element cable switch to isolation loss of a conventional switch asymptotically approaches 3 as length increases to a quarter wavelength. It has been found, however, that the ratio increases very rapidly with small initial increases in length, i.e., it reaches a magnitude of about 2.3 at a length of 0.005λ. Consequently it is unnecessary to make the coaxial line segment 38 a full quarter wavelength long in order to optimize isolation loss. Instead, sufficient isolation loss is obtained for all practical purposes if the length merely exceeds 0.005λ.

As best seen in FIG. 6, each coaxial line segment 38 includes a center conductor 41, a connector 42 at each end of the center conductor 41, a portion of the tube 36 and an insulator 43 surrounding all of the other components. The insulator 43 is made of a molded polypropylene having a relative dielectric constant of 2.3. In the embodiment illustrated, the center conductor 41 is physically about 2 inches long and is made of a copper wire having a diameter of about 0.010 inch. Given these physical characteristics together with the dimension of the tube 36, the characteristics impedance of the coaxial line segment 38 is about 120 ohms.

In the frequency range contemplated, the switching device 20 is designed to provide a transmission path having an effective characteristic impedance of 75 ohms. It has been found, however, that if the characteristic impedance of the coaxial line segment 38 exceeds 75 ohms by at least 50 percent, it will balance the impedances of other parts of the switching device 20 so that the resulting overall characteristic impedance will be effectively 75 ohms.

The connectors 42 join the coaxial line segment 38 to the individual reed switches 37. Each connector 42, as shown in FIGS. 5 and 6, is an elongated member made of an electrically conducting material such as beryllium copper and has a pocket at each end. One pocket is adapted to accept the end of the contact 40 while the other is adapted to accept the end of a center conductor 41. When the respective ends are inserted, the pockets are crimped so as to form a rigid connection.

When installed, the cable switches 33 are disposed parallel to each other and, as best seen in FIG. 2, the bracket 31 supports one set of ends in two spaced, parallel planes to facilitate connection to the jacks 34. As best seen in FIG. 2, the bracket 31 supports one set of ends in two spaced, parallel planes to facilitate connection to the jacks 34. As best seen in FIG. 2, alternate ends are disposed in opposite planes.

The jacks 34 are standard commercially available types, such as the 477B type as coded by the Western Electric Company, and are mounted on the bracket 31 and supported on the frame assembly 80 in a conventional manner. As seen in FIGS. 1 and 2, however, they are staggered to form two groups which correspond to the planes containing the ends of the cable switches 33. Each jack 34 is electrically connected at one end to a cable switch 33 and at the other end serves as the terminus for an individual transmission line (not shown).

Individual transmission lines terminated on the cable switch assembly 30 extend to the common transmission line (not shown) through the conductor path assembly 50. As shown in FIGS. 1 and 2, the conductor path assembly 50 comprises a conductor path housing 51, a bracket 52 and jack 53.

Figure 3:
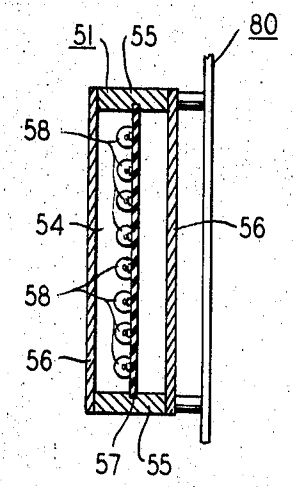
FIG. 3 is a section view taken along the line 3–3 in FIG. 1 to show details of a conductor path assembly.

The conductor path housing 51 is mounted on the frame assembly 80 and, as seen in FIGS. 1, 2 and 3, comprises two end members 54, two side members 55, two conductor plates 56 and a strip line 57. The end members 54, the side members 51 and the conductor plates 56 are joined together to form a box structure which contains the strip line 57. The conductor plates 56 are made of copper and the end and side member are conveniently made of a plastic material such as Celcon as manufactured by the Celanese Corporation. Where the control of crosstalk is important, the end and side members must also be covered with a conducting material such as copper.

As shown in FIGS. 1 and 2, the bracket 52 is attached to the frame assembly 80 in a conventional manner and supports one end of the jack 53. The jack 53 acts as he terminus for the common transmission line (not shown) and is conventional; that is, it is a 477B type jack as coded by the Western Electric Company. The other end of the jack 53 is supported by the housing 51 where it is electrcially connected to the strip line 57.

Figure 4:
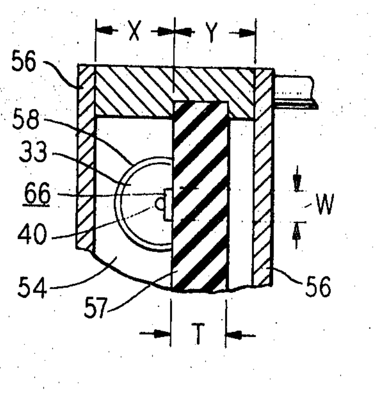
FIG. 4 is a section view of an enlarged portion of the conductor path assembly shown in FIG. 3.

The strip line 57 contains the circuits which electrically link the cable switches 33 and the jack 53. As shown in FIGS. 1, 3 and 4, it is essentially a printed circuit board having a thickness T and is mounted in the conductor path housing 51 with its surfaces spaced distances X and Y from the conductor plates 56, respectively. Specifically, it is contained in slots in side members 55 with one surface disposed coplanar to the center lines of a plurality of holes 58 located in one end ember 54. As seen in FIG. 4, each hole 58 supports the end of a cable switch 33 and, as can be seen from FIG. 2, disposes those ends in a common plane spatially located between the planes containing the opposite cable switch ends. As best seen in FIG. 4, the end 40 of a reed switch 37 extends out of each hole 58 and lies on the coplanar surface of the strip line 57 to make contact with a conductor array 61.

As can be understood from FIGS. 3 and 4, the conductor array 61 is supported by the coplanar surface of the strip line 57. Electrically, it cooperates with the conductor plates 56, which act as ground planes, to establish a multipath transmission line extending between the cable switches 33 and the jack 53. Physically, as best seen in FIG. 1, the conductor array 61 is made up of segments of deposited copper linked in series to form a group of conductor paths. More precisely, each conductor path is composed of a group of serially connected segments which extend in an unbroken path between an input to the common transmission line (i.e., the jack 53) and an input to each individual transmission line (i.e., the cable switches 33). Moreover, each conductor path has the same length as every other conductor path.

Viewed another way, the conductor array 61 includes five functional groups; viz, an access path 62 located at one end of the strip line 57 which acts through the jack 53 as an input to the common transmission line (not shown) and which is looped in order to improve the symmetry of the switching device 20 in both conducting directions; two primary branches 63, two secondary branches 64 and four tertiary branches 65 all of which are located centrally on the strip line 57 and which act through the cable switches 33 and jacks 34 as inputs to the individual transmission lines (not shown). When combined, these groups cooperate to form the symmetrical system or tree of conductor paths which is the conductor array 61.

In the embodiment illustrated, each of the two primary branches 63 is divided into two portions which are approximately equal in length, but which have unequal widths. Moreover, both primary branches 63, the access path 62 and, is desired, an impedance trimming resistor 59 for improving the impedance match between the switching device 20 and the transmission lines terminated thereon, are joined at one end in a common connection. In the embodiment disclosed, the resistor 59 has a value of 2,740 ohms. At the other end, each primary branch 63 is joined to a separate access path 66. Similarly, one end of each secondary branch 64 joins the approximate midpoint of a primary branch 63. At the other end, each joins an access path 66. In addition, one end of each tertiary branch 65 joins either approximate quarter point of a primary branch 63 or either midpoint of a secondary branch 64. At the other end, each joins an access path 66. Finally, the access path 62 is electrically joined to the jack 53, while the access paths 66 are joined to the cable switches 33. To insure good electrical continuity, the connection between the cable switches 33, shown in FIG. 4, for example, and the strip line 57 is made by soldering the conductors 40 to the access paths 66.

By laying out the conductor array 61 on the strip line 57 as described, every conductor path has the same physical length from its termination on a cable switch 33 to its termination the access path 62. Moreover, each conductor path has identical stubbing, transmissionwise. Finally, the loop in the access path 62 has a length such that the overall length of the access path 62 is the same as the length of each conductor path to its termination on its associated access path 66.

While the foregoing arrangements satisfy most transmission line requirements, it is still necessary that the conductor array 61 and the cable switches 33 cooperate with each other to provide an invariant effective characteristic impedance regardless of which cable switch is operated.

In the embodiment illustrated, the characteristic impedance desired is 75 ohms. In achieving this impedance value, the material from which the strip line 57 is made, the shape and size of the conductor paths in the conductor array 61 and the spacing of the strip line 57 in the conductor path housing 51 have all been carefully adjusted so as to cooperate with the impedance characteristics of the cable switches 33.

For example, the strip line 57 is made of epoxy-glass and, as shown in FIGS. 3 and 4, the thickness T is 0.062 inch. As best seen in FIGS. 1 and 4, the access path 62 is 0.052 inch wide, while the loop portion thereof is 0.010 inch wide. Substantially half of each primary branch 63 is 0.012 inch wide; that is, the portion of each which is terminated on the access path 62, while the remaining halves are 0.052 inch. The secondary and tertiary branches 64 and 65 are all 0.012 inch wide, while the access path 66 are 0.025 inch. All of the foregoing are 0.0014 inch thick. Finally, the conductor array 61 is precisely located within the conductor path housing 51 with respect to the conductor plates 56 by the strip line 57. As illustrated in FIGS. 3 and 4, the distances X and Y are equal and each has a magnitude of 0.500 inch.

When the cable switch assembly 30 and the conductor path assembly 50 are properly adjusted, as in the manner described signals can be switched through the switching device 20 from either direction without substantial impairment, transmissionwise. Thus, while the switching device 20 on its face is electrically asymmetrical, signals from either direction will encounter the same characteristic impedance, i.e., 75 ohms.

Mechanically, the switching device 20 is readily mounted as a unit in working location. As illustrated in FIGS. 1 and 2, both the cable switch assembly 30 and the conductor path assembly 50 are supported by the frame assembly 80. The frame assembly 80 includes a support plate 81 and a backing plate 82. The two plates are joined together at right angles in a conventional manner to form a rigid support. Both plates are made of a rigid material such as aluminum and contain suitable mounting holes or slots. Finally, a cover (not shown) can be installed on the frame assembly 80 to protect the components from the environment if desired.

Operation of the switching device 20 is best understood from FIG. 1. A signal, entering the jack 53 from the common transmission line, for example, is switched through a selected cable switch 33 to an individual transmission line by passing a current through the particular coil unit 39 associated with the selected cable switch 33. When the cable switch 33 is activated, an unbroken signal conducting path is established through the jack 53, the access path 62, a conductor path on the strip line 57, the closed contacts of the selected cable switch 33, an access path 66 and, finally, the associated jack 34 thereby electrically interconnecting the common transmission line and the selected individual transmission line. Consequently, the path a signal takes in traveling between the access path 62 and any access path 66 is automatically determined merely by operating a selected cable switch 33.

The cable switches 33 are selectively operated by passing currents, supplied by an external control source (not shown) to specific coil units 39 through the connector unit 32. In order to automatically switch the signal from one transmission line to another, therefore, it is necessary only to discontinue the current being applied to an operated cable switch 33 and then pass current through the newly selected one. Regardless of which cable switch 33 is operated, however, the signal will encounter the same effective characteristic impedance as it traverses the switching device 20. Consequently, switching from one transmission line to another without significantly impairing the integrity of the signal being switched is readily achieved automatically in the disclosed arrangement.

Figure 11:
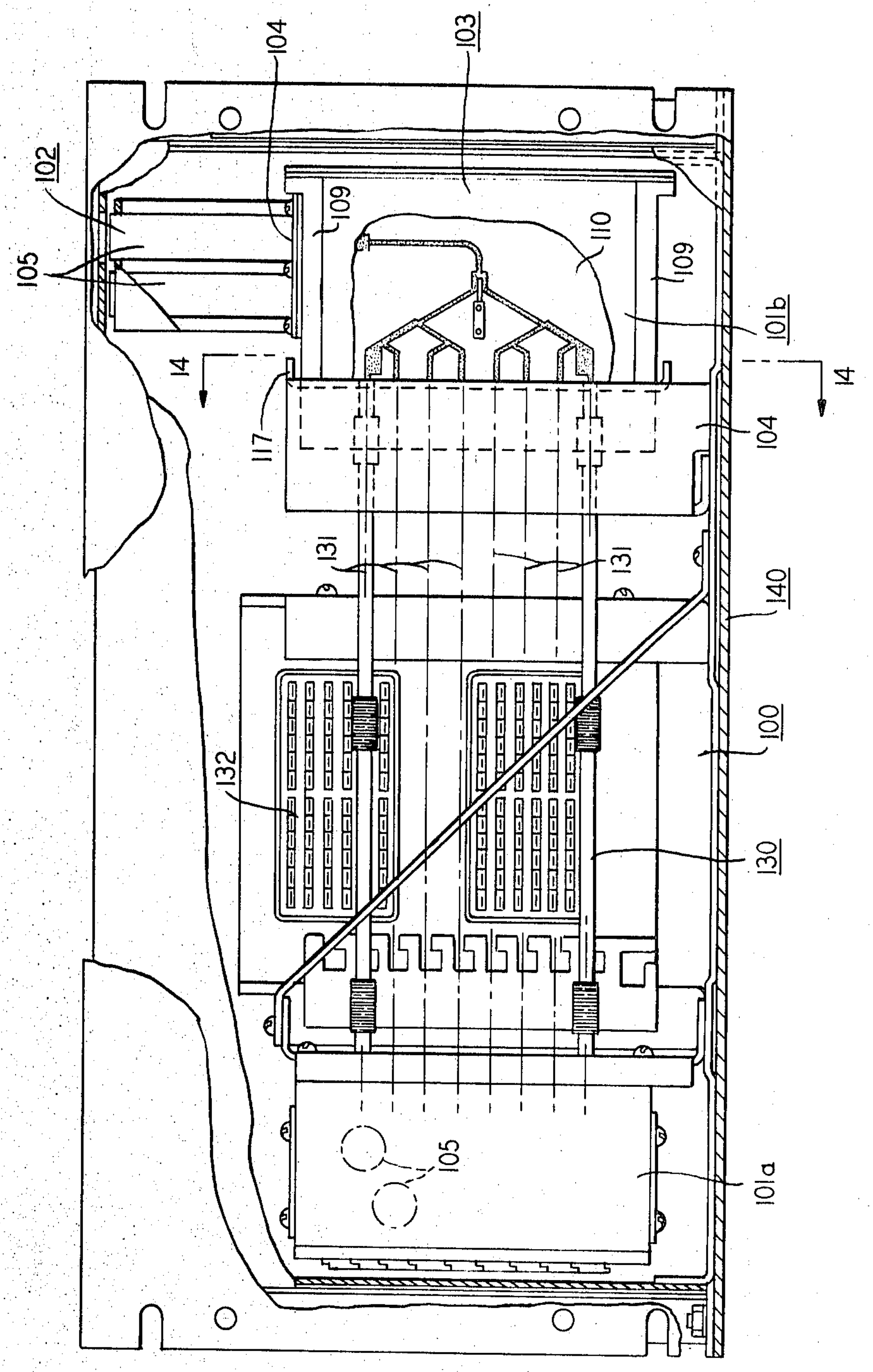
FIG. 11 is a plan view of another embodiment of a switching device constructed in accordance with this invention.

In addition to the embodiment described, other are also advantageous. Referring to FIG. 11, for example, a switching device 100 is disclosed which has an eight-fold increase in capacity. It functions in the same way as the previously described switching device 20 except that it selectively interconnects one common transmission line in a group of eight to one common transmission line in another group of eight as opposed to selectively interconnecting a single common transmission line to one of eight individual transmission lines. In doing so, two conductor path assemblies **101*a* and 101*b* are used instead of one. As before, however, only one cable switch assembly 130, albeit of greater capacity, and one frame assembly 140 are used. Again as before, both conductor path assemblies 101***a* and 101*b* extend conductor paths between transmission line groups and a cable switch assembly 130 determines the specific path a signal is to take in passing from one group of transmission lines to the other. Finally, the frame assembly 140 supports the apparatus in a work environment and provides protection from external hazards.

The two conductors path assemblies 101*a* and 101*b* are essentially identical, so a description of one will suffice for the other. As illustrated in FIGS. 11, the conductor path assembly 101*b* includes a jack assembly 102, a conductor path housing 103 and a bracket 104.

Figure 12:
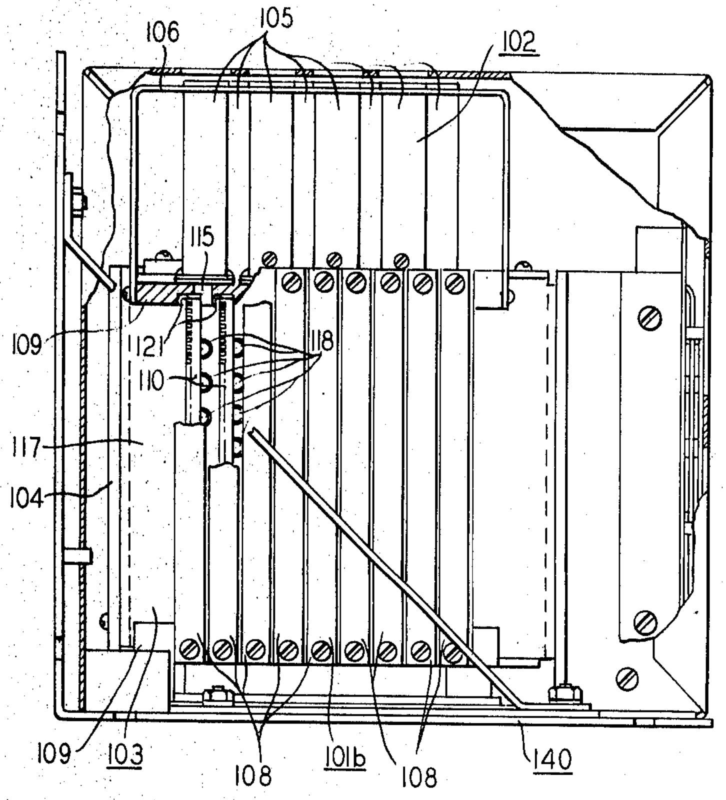
FIG. 12 is an end elevation view of the switching device shown in FIG. 11.
Figure 13:
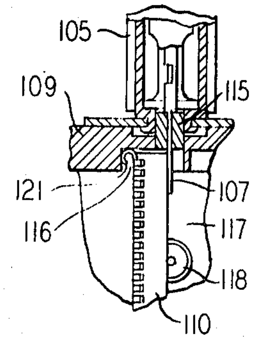
FIG. 13 is an enlarged section view of a portion of the switching device shown in FIG. 12 illustrating the connection between a jack and a strip line.

The jack assembly 102 acts at one end as a terminus for eight common transmission lines (not shown). At the other end, it serves as an input to circuitry in the conductor path housing 103. As best seen in FIG. 12, it contains eight jacks 105 and a support strap 106. The jacks 105 are conventional, commercially available types such as the 478A type manufactured by the Western Electric Company. As shown in FIG. 13, however, each contains a projecting conductor lead 107. As shown in FIG. 12, the jacks 105 are held in place against the conductor path housing 103 by the support strap 106. The support strap 106 is made of a material such as aluminum and is attached to the conductor path housing 103 in a conventional manner.

Figure 14:
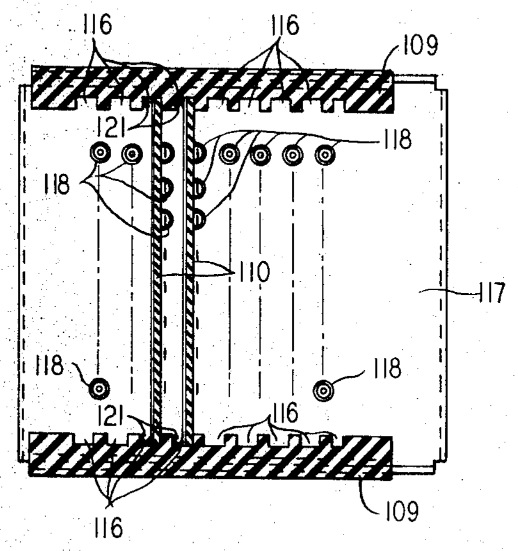
FIG. 14 is a section view of a portion of the switching device shown in FIG. 11 taken along the lines 14–14.

The conductor path housing 103, as shown in FIG. 12, includes nine end covers 108, two side rails 109 and eight strip lines 110. The end covers 108 and the side rails 109 are made of a rigid material such as aluminum. Both, however, should be electrically conducting. As best seen in FIGS. 12 and 14, each side rail 109 contains a number of holes 115 and a number of parallel tracks or slots 116. As can be seen in FIGS. 12 and 13, each hole 115 accommodates a jack 105, while the slots 116 accommodate the strip lines 110. Moreover, each hole 115 is precisely located with respect to the shoulders of its associated slot 116 so that the lead 107 in the associated jack 105 will be aligned with appropriate portions of the strip line 110 when it is inserted in the side rails 109.

Both side rails 109 are mounted above the frame assembly 140. Moreover, as can be seen from FIGS. 11 and 12 both are held in parallel relationship to each other by the bracket 104 and an end plate 117.

The bracket 104 is made of a rigid material such as aluminum and is firmly attached to the frame assembly 140. The end plate 117 is also made of rigid material such as aluminum, is advantageously electrically conducting and is attached to the bracket 104 in a conventional manner. In addition, as shown in FIG. 14, it includes a plurality of holes 118 for accommodating portions of the cable switch assembly 130.

As illustrated in FIG. 14, the holes 118 are arranged in a matrix of rows and columns. Moreover, each column is aligned with a pair of slots 116 in opposite side rails 109 so that the center line of each hole in the column is indexed with respect to one shoulder of each slot 116 and a common surface on a strip line 110 when installed.

The strip lines 110 are stacked in parallel relation to each other and each slides into a pair of slots 116. As best seen in FIGS. 12, each is held in place by an end cover 108. All of the strip lines 110 are essentially identical, so a description of one will suffice for all.

Figure 10:
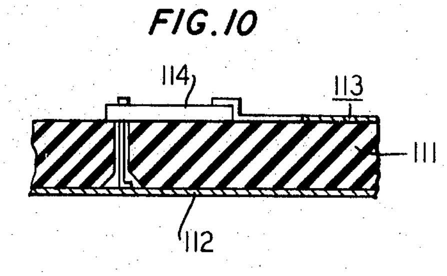
FIG. 10 is an enlarged section view of a portion of the strip line shown in FIG. 7.

As shown in FIGS. 7, 8, 9 and 10, each strip line 110 comprises a circuit board 111, a ground plane spring 112, a conductor array 113, and, if desired, an impedance trimming resistor 114. As best seen in FIG. 10, one side of the circuit board 111 supports the conductor array 113 while the other side supports the ground plane spring 112.

The conductor array 113 comprises segments of copper deposited on the surface of the circuit board 111. Furthermore, the segments are, as in the earlier described embodiment, interconnected to form a symmetrical system or tree configuration. Access into an out of the conductor array 113 is through one access path 122 and eight access paths 123. The access path 122 includes two input segments 122*a* and 122*b* which, for reasons described below, lie side by side.

As in the strip lines described earlier, the segments combine to form conductor paths in which each shares at least one segment in common with another. Moreover, all of the conductor paths are unbroken over their entire length, all have the same effective length and all have identical stubbing transmission-wise. Finally, as shown in FIG. 10, the resistor 114 has one end connected to a segment leading to the inputs 122*a* and 122*b* and the other end extending through the circuit board 111 to the ground plane spring 112. In the embodiment described the resistor 114 has a value of 8,250 ohms.

As in the earlier embodiment, the conductor array 113 can be conveniently described as comprising, in addition to the access paths 122 and 123, a pair of primary branches 124, a pair of secondary branches 125 and four tertiary branches 126. The primary branches 124 are joined at one end in common with the access path 122 while each terminates on an access path 123 at the other end. One end of each secondary branch 125 is joined to the midpoint of a primary branch 124 while the other end is joined to an access path 123. Lastly, one end of each tertiary branch 126 joins the quarter point of a primary branch 124 or the midpoint of a secondary branch 125, respectively, while the other end joins an access path 123.

Figure 8:
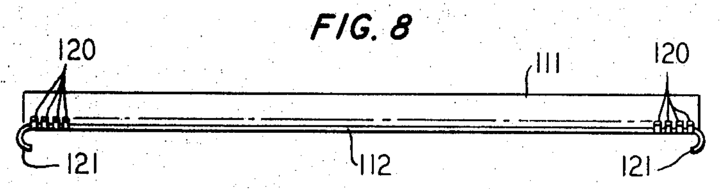
FIG. 8 is an elevation view of the strip line shown in FIG. 7.
Figure 9:
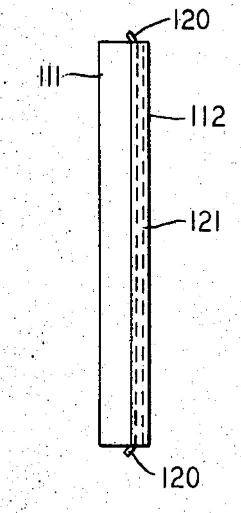
FIG. 9 is an end elevation view of the strip line shown in FIG. 7.

The ground plane spring 112, as best seen in FIG. 8, is attached firmly to the side of the circuit board 111 and comprises a sheet of beryllium copper which has been overplated with fifty-millionths of an inch of hard gold for corrosion resistance. It is rectangular in shape and two parallel edges are serrated and bent up to form sets of spring tabs 120, while the other two parallel edges are rolled to form sets of spring loops 121. Basically, the spring tabs 120 and the spring loops 121 locate the circuit board 111 and hold it in place. In addition, however, both cooperate to help reduce crosstalk by extending grooved surfaces around all sides of the circuit board 111.

As can be seen in FIGS. 12, 13 and 14, the spring loops 121 press the circuit board 111 against one side of its slot 116. In addition, the spring tabs 120 press against the end plate 117 and the end covers 108. Consequently, the surface of the circuit board 111 carrying the conductor array 113 is indexed with respect to one shoulder of the slot 116 and electrical contact is made with the side rails 109, the end covers 108 and the end plate 117. As a result, the conductor array 113, e.g., the access paths 123, is aligned with respect to one column of holes 118 in the end plate 117 and a single hold 115 in the side rail 109, respectively. As a consequence, electrical leads projecting through the various holes, i.e., the lead 107 and leads from the cable switch assembly 130, are readily joined to appropriate portions of the conductor array 113.

Moreover, as can be seen from FIG. 14, each strip line 110 is indexed with respect to its neighbor. As a consequence, each conductor array 113 is effectively sandwiched between the ground plane spring 112 on the underside of its own circuit board 111 and the ground plane spring 112 on the underside of an adjacent circuit board 111. Each conductor array 113 and the bracketing ground plane springs 112, therefore, cooperate with each other to form a transmission line segment wherein the conductor array 113 acts as the center conductor. Finally, the transmission line segment extends between common transmission lines (not shown) terminated on the jack assembly 102 and the cable switch assembly 130.

As can be understood from FIGS. 12 and 13, each jack 105 in the jack assembly 102 terminates on a single strip line 110. In order to conserve space in the conductor path housings, however, the jacks 105 are disposed in two parallel rows. Each of the rows, in turn, coincides with one of the access paths 122*a* or 122*b* on the strip lines 110. Thus, regardless of which row contains the jack 105, its lead 107 will be positioned adjacent to an access path 122*a* or 122*b*, as the case may be, and can be readily soldered in place when the strip line is inserted. As a consequence, space is conserved without detriment to the interchangeability of the strip lines 110.

From its jack 105, each conductor array 113 extends directly to the cable switch assembly 130. As can be recognized from FIG. 11, the cable switch assembly 130 comprises a connector assembly 132 and 64 cable switches 131. The cable switches 131 are disposed in a matrix of rows and columns containing eight cable switches each and each cable switch is terminated on an access path in a strip line 110. All of the cable switches are identical to each other as well as those previously described. Thus, they need not be described again.

Figure 7:
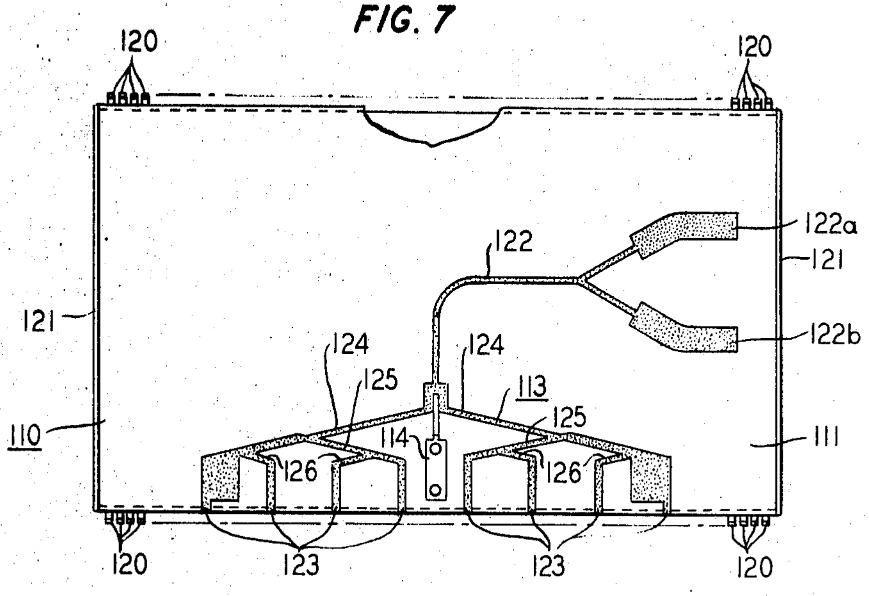
FIG. 7 is a plan view of one embodiment of a strip line.

As can be understood from FIGS. 7, 11 and 12, any jack 105 at one end of the switch device 100 can readily be connected to any jack 105 at the other end. All of the cable switches 131 in the same vertical column terminate on the same strip line 110 in the conductor path assembly 101*a*, while each terminates on a different strip line 110 in the conductor path assembly 101*b*. Thus, the transmission line associated with the strip line 110 just described can be connected to any transmission line terminated in the conductor path assembly 101*b*.

Conversely, all of the cable switches 131 in the same horizontal row terminate on the same strip line 110 in the conductor path assembly 101*b*, while each terminates on a different strip line 110 in the conductor path assembly 101*a*. As a result, the transmission line terminated in the jack 105 associated with the strip line 110 just described can be connected to any transmission line terminated in the conductor path housing 101*a*. Thus, any transmission line at one end of the switching device 100 can be connected to any transmission line at the other end by operating the appropriate cable switch 131.

Actual interconnection occurs when a selected cable switch 131 is operated. As in the first-described embodiment, cable switches are selectively operated by energizing currents which are applied via the connector assembly 132. As before, the connector assembly 132, as shown in FIG. 11, is a multiple plug assembly of standard design, such as the type FM 75 manufactured by the Continental Connector Company. The connector assembly 132, as does its counterpart in the switching device 20, extends leads to the operating coils of each cable switch 131 over which energizing current from an external source (not shown) is conducted.

In the embodiment disclosed an effective characteristic impedance of 75 ohms has been obtained when the following requirements, as set forth in the table below, are used.

Table

Figure 15:
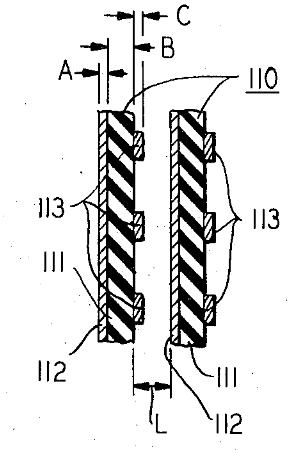
FIG. 15 is an enlarged section view of a portion of the switching device shown in FIG. 14 illustrating the spacing between adjacent strip lines.

| | |
|---|---|
| Material of circuit board | epoxy-glass |
| A Dimension (FIG. 15) | 0.005 inch |
| B Dimension (FIG. 15) | 0.187 inch |
| C Dimension (FIG. 15) | 0.0014 inch |
| L Dimension (FIG. 15) | 0.135 inch |

In addition, all of the conductor paths have the same thickness throughout while the access path 122 is 0.010 inch wide except for the two input segments 122*a* and 122*b* which are each 0.125 inch wide. Approximateiy half of each primary branch 124 is 0.010 inch wide, that is, the portion which forms a junction with the access path 122. The junction, however, is widened into a square approximately 0.125 inch on a side. The remaining portion of the primary branches 124 are 0.030 inch wide, the secondary and tertiary branches 125 and 126 are all 0.010 inch wide, the access paths 123 are 0.030 inch wide and the corners between the primary branches 124 and their associated access paths 123 are widened into squares approximately 0.1875 inch on a side. Finally, the capacitive effect of the open stubs in the conductor array 113 is overcome by inductively tuning the segments; that is, by adjusting their length until sufficient inductance is obtained to tune out stub capacitance at the desired frequency.

In summary, embodiments have been disclosed wherein transmission lines from two groups can be automatically selected and interconnected by switching apparatus in which the effective characteristic impedance remains constant regardless of which two transmission lines are interconnected. It will be understood, however, that these embodiments are merely illustrative of the principles of the invention and others will readily occur to those skilled in the art.

We claim:

1. Apparatus for selectively switching high frequency signals between a common transmission line and one of several independent transmission lines including an array of conductor paths and cable switches wherein each cable switch terminates on an individual transmission line and each conductor path includes at least two serially connected segments wherein at least one segment is shared in common with another conductor path characterized in that said array includes a common access path associated with said common transmission line, eight individual access paths associated with said individual transmission lines, two primary branches, two secondary branches and four tertiary branches wherein each primary branch joins the other and said common access path at one end and joins an individual access path at the other end; each of said two secondary branches joins the approximate midpoint of a primary branch at one end and an individual access path at the other end; and each of said four tertiary branches joins a quarterpoint of a primary branch or a midpoint of a secondary branch, respectively, at one end and an individual access path at the other end whereby a tree configuration having a common termination at one end and eight individual terminations at the other is formed.

2. Apparatus in accordance with claim 1 wherein each of said primary branches is divided into two parts of unequal width.

3. Apparatus in accordance with claim 1 wherein said primary, secondary and tertiary branches are all the same length, respectively, whereby said tree configuration is symmetrical.

4. Apparatus in accordance with claim 2 wherein the angle between each primary branch and its associated individual access path is filled with electrically conducting material and the widest of said two parts is joined to said access path.

5. Apparatus in accordance with claim 1 wherein said common access path has the same physical length as that portion of each conductor path which includes said primary, secondary and tertiary branches.

6. Apparatus in accordance with claim 1 wherein said common access path includes a impedance trimming resistor shunted to ground.

7. Apparatus in accordance with claim 1 wherein said array lies on one side of a circuit board and said circuit board is disposed between a pair of ground plane conductors separated from said circuit board by a dielectric material whereby each conductor path acts as the center conductor of a transmission line.

8. Apparatus in accordance with claim 7 wherein one of said ground plane conductors is attached to said circuit board on a side opposite to that containing said array and includes spring loops for positioning said circuit board with respect to the other of said pair of ground plane conductors and spring tabs for holding said circuit board in place after is has been positioned.

9. Apparatus in accordance with claim 8 wherein said circuit board has a relative dielectric constant of 5.3 and a thickness of approximately 0.187 inch and the other of said ground plane conductors is separated from said circuit board by an airspace 0.135 inches wide.

10. Apparatus in accordance with claim 1 wherein each of said cable switches includes a group of reed switches and coaxial line segments alternately connected in series wherein each coaxial line segment has a characteristic impedance at least 50 percent greater than the overall effective characteristic impedance of any conductor path-cable switch combination.

11. Apparatus in accordance with claim 9 wherein each coaxial line segment has a length of at least 0.005 $\lambda$ whereby isolation loss in said apparatus is substantially increased.

12. Apparatus in accordance with claim 10 wherein said coaxial line segment comprises a copper center conductor, a surrounding sleeve and a portion of a conducting tube wherein said center conductor has a diameter of 0.010 inch, said sleeve has a relative dielectric constant of 2.3 and said tube has an inner diameter of 0.200 inch.

13. Apparatus in accordance with claim 11 wherein said center conductor is joined to said reed switches by a connector member having a pocket at each end, one pocket being adapted to grip a reed from a reed switch and the other being adapted to grip one end of said center conductor.

14. Apparatus in accordance with claim 9 wherein the contacts in said reed switches are plated with a gold-silver alloy over the entire signal conducting surface.